United States Patent [19]
Kikuchi

[11] 3,806,853
[45] Apr. 23, 1974

[54] APPARATUS FOR COMPENSATION OF PINCUSHION DISTORTION

[75] Inventor: Masakazu Kikuchi, Takasaki, Japan

[73] Assignee: Taiyo Yuden Kabushiki Kaisha, Chiyoda-ku, Tokyo, Japan

[22] Filed: Oct. 11, 1972

[21] Appl. No.: 296,647

[30] Foreign Application Priority Data

Feb. 17, 1972 Japan ................................ 47-18913

[52] U.S. Cl. .............................. 335/210, 315/27 SR
[51] Int. Cl. ............................................... H01f 7/00
[58] Field of Search ........ 335/210, 227; 313/75, 76, 313/77; 315/27 SR

[56] References Cited

UNITED STATES PATENTS

| | | | |
|---|---|---|---|
| 3,346,765 | 10/1967 | Barkow | 315/27 SR |
| 3,681,725 | 8/1972 | Ikeuchi | 315/27 SR X |
| 3,716,748 | 7/1970 | Sohoma | 315/27 SR |

*Primary Examiner*—George Harris
*Attorney, Agent, or Firm*—Waters, Roditi, Schwartz & Nissen

[57] ABSTRACT

In a casing of a device provided for compensating pincushion distortion in television receivers are arranged holes in which are placed compensating magnets. These magnets cooperate with a core and coils located within the casing.

7 Claims, 7 Drawing Figures

APPARATUS FOR COMPENSATION OF PINCUSHION DISTORTION

FIELD OF INVENTION

This invention relates to a circuit or apparatus using a saturable reactor type transformer or method for the compensation of pincushion distortion effect generated asymmetrically in television receiver sets.

BACKGROUND

When a Braun tube in a television receiver set employs a large deflection angle to comply with the requirement that the receiver set be flat in depth and small in size, pincushion distortion in the raster thereof becomes conspicuous. For compensation of this type of distortion, a saturable reactor has hitherto been used.

As is known, pincushion distortion occurs at the top and the bottom of the raster and takes the form of inverted arcs of distortion whereby the center of the raster is smaller than the opposite ends thereof considered in a horizontal direction.

As is known in the mass production of television receiver sets, the top pincushion distortion degree and the bottom pincushion distortion degree are not always equal and there may be a fairly large difference therebetween. The value of the distance is not always uniform from set to set.

For changing the pincushion distortion continuously and substantially, a saturable reactor type transformer generating a continuously variable magnetic field bias has been used. For example, an arrangement is known, as will be described hereinafter, in which a rod form magnetic for influencing the magnetic flux of the magnetic circuit of a saturable reactor, is movably provided.

The particular arrangement previously proposed by the Applicant herein is an arrangement in which a drum core of ferrite magnetic material comprises a core shaft having spaced flanges thereon, defining spaces therebetween. In these spaces are provided primary and secondary windings in close coupling relationship. The secondary windings are connected in bucking relationship.

Furthermore, plate-form magnets are provided in this prior art arrangement for giving a magnetic field bias in the longitudinal direction of the drum core. These plate-form magnets are arranged at opposite ends of the drum core. Moreover, a circular permanent magnet having magnetic poles formed at the periphery thereof is so provided on one side of a casing containing the drum core as to have its center axis at right angles to the magnetic flux direction of the drum core and so as to be rotatable.

The arrangements of this prior art construction can adjust a large non-uniformity in distortion but it is very difficult to make fine adjustments with the same. Morever, owing to quality control and improvements in the accuracy of parts used in recent mass production processes for television receiver sets, the difference between the top and pincushion distortion has become very small. The non-uniformity of the valve of the same has also become small. Thus, pincushion distortion has come to be kept within small, predetermined ranges.

SUMMARY OF INVENTION

It is an object of the invention to provide an improved method and technique for the compensation of pincushion distortion.

It is a further object of the invention to provide an improvement in pincushion distortion apparatus and techniques, particularly suitable for the compensation of small amounts of pincushion distortion which lie within small predetermined ranges and which is easy to manufacture and economical, and is suitable particularly when the compensation requirements for asymmetrical top and bottom pincushion distortions are small.

It is yet another object of the invention to provide an improvement and refinement of Applicant's own prior construction, in which a magnetic field bias is provided in the form of a saturable reactor type transformer providing a magnetic field bias.

To achieve the above and other of its objects, there is provided in accordance with the invention an apparatus for compensating pincushion distortion in television receivers, such apparatus comprising a core of ferrite material which is magnetic and includes a shaft and spaced flanges on the shaft defining spaces therebetween, therebeing furthermore provided primary and secondary windings on the shaft in said spaces to form a saturable reactor type transformer to generate a magnetic field bias. In addition, there is provided a non-magnetic casing encasing the aforesaid transformer, said casing being provided with at least one opening and at least one magnet in said opening, in said field, to influence the latter, and thereby provide fine pincushion distortion compensation.

According to a preferred embodiment of the invention, the magnet is wedge-shaped. According to another aspect of the invention, the aforesaid casing is provided with a plurality of opening and there are a plurality of said magnets provided in the openings, the magnets being differently magnetized.

Preferably, the aforesaid openings are provided in the casing adjacent the aforesaid flanges.

According to the invention, the improvements are moreover preferably provided in a saturable reactor type transformer arrangement in which the secondary windings are arranged in bucking relationship.

Preferably the casing is a right quadrilateral with a relatively large opening therein to accommodate the aforesaid core, the openings provided in the casing being generally in parallel to the large opening. The magnets employed in accordance with the invention are preferably of the permanentaly magnetized type.

In further accordance with the invention there is provided in association with the apparatus described hereinabove, a method for the fine adjustment of said pincushion distortion comprising influencing the magnetic field mentioned above by placing at least one small permanently magnetized magnet on or in said casing. As has been noted, a plurality of such magnets may be employed and these may be of different magnetization.

Other objects and features, as well as advantages of the invention, will be seen hereinafter.

BRIEF DESCRIPTION OF DRAWING

The invention will be more clearly understood from the detailed description which follows herinafter, as described in the accompanying drawing in which:

FIGS. 4 (A) and (B) are each a diagram for the explanation of a small magnet piece used therein.

DETAILED DESCRIPTION

Figures 1, 2, 3, 4A, 4B:
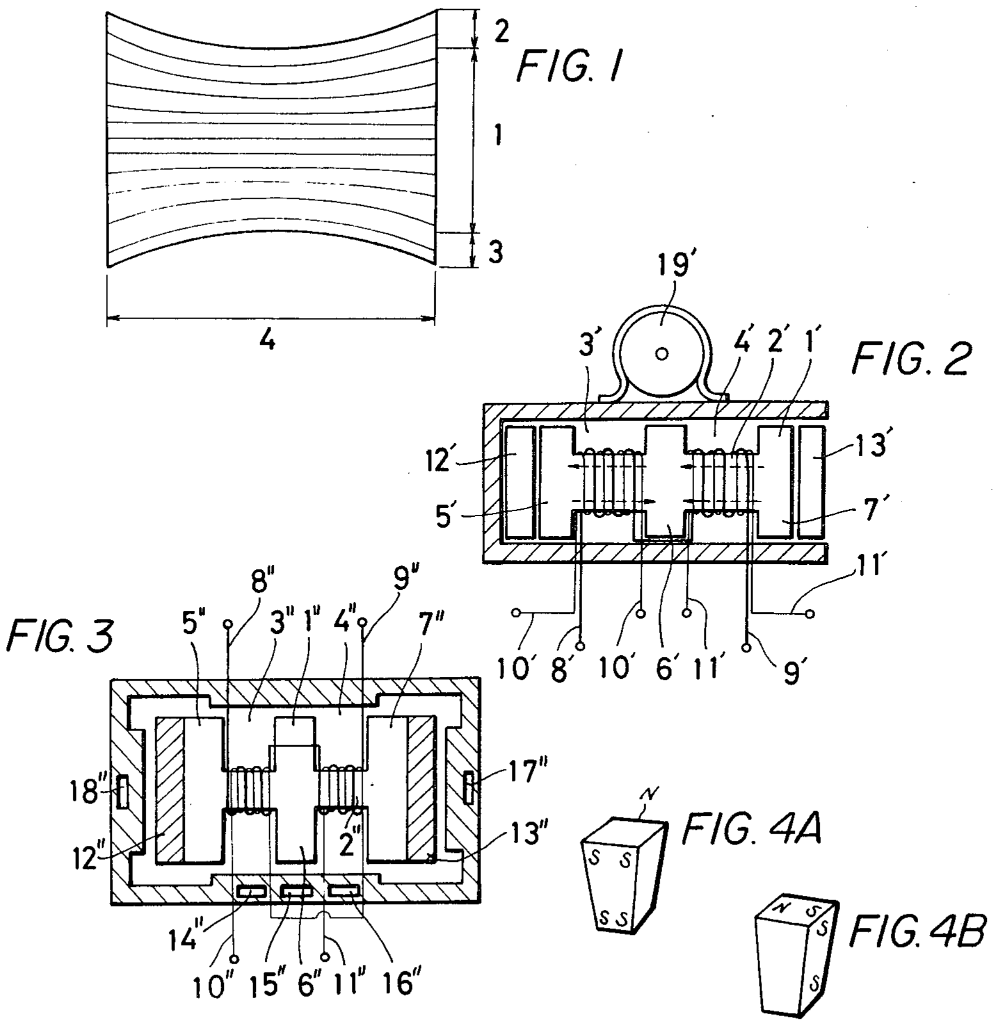
FIG. 1 is a diagram explaining pincushion distortion effect as may be caused in a raster on the picture surface of a television receiver set.
FIG. 2 is a side view of a pincushion distortion compensation circuit and apparatus proposed prior to the present invention.
FIG. 3 is a side view of one embodiment of this invention.

FIG. 1 represents diagrammatically the pincusion distortion effect which can be generated in a raster. In FIG. 1, 1 denotes the vertical amplitude at the center portion of the raster, 2 denotes the top pincushion distortion degree, 3 denotes the bottom pincushion distortion degree and 4 denotes horizontal amplitude.

In the mass-production process of television receiver sets, the top pincushion distortion degree 2 and the bottom pincushion distortion degree 3 are not always equal and there is a fairly large difference therebetween. The value of the difference is not uniform. For changing the pincushion distortion continuously and substantially, a saturable-reactor type transformer generating a continuously variable magnetic field bias has been used.

For example, an arrangement has been known in which a rod form magnet for influencing the magnetic flux of the magnetic circuit of a saturable reactor is movably provided. Also, an arrangement as seen in FIG. 2 has been previously proposed by the Applicant.

In FIG. 2, the arrangement is such that a drum core 1′ of ferrite magnetic material comprises a core shaft 2′ having flanges 5′, 6′ and 7′ thereon with spaces 3′ and 4′ formed therebetween. In these spaces are provided primary windings 8′ and 9′ and secondary windings 10′ and 11′ in close coupling relationship. The secondary windings 10′ and 11′ are connected in bucking relation. Further, plate-form magnets 12′ and 13′ for giving a magnetic field bias in the longitudinal direction of the drum core 1′ are provided at the opposite ends of the drum core 1′. Moreover, a circular permanent magnet 19′ having magnetic poles formed at the periphery thereof is so provided on one side of a casing containing the drum core 1′ as to have its center axis at right angles to the magnetic flux direction of the drum core 1′ and to be rotatable.

These arrangements can adjust a large non-uniformity in distortion but it is very difficult to make a fine adjustment with the same. Owing to quality control and improvements in the accuracy of parts used in recent mass-production processes for television receiver sets, the difference between the top and bottom pincushion distortion becomes very small and the non-uniformity of the value thereof also has become small. Thus, pincushion distortion can be kept within small predetermined ranges.

The present invention has been developed with a view toward obtaining, without using a movable adjusting mechanism, a distortion compensation circuit apparatus which is easy to manufacture and is economical, and is suitable when the compensation requirements for the asymmetrical top and bottom pincushion distortions are small.

One embodiment of the invention is shown in FIG. 3. In FIG. 3 element 1″ is a drum core which comprises a core shaft 2″ of soft magnetic ferrite material having flanges 5″, 6″ and 7″ with spaces 3″ and 4″ formed therebetween.

Primary windings 8″ and 9″ and secondary windings 10″ and 11″ are wound within each of the foregoing spaces 3″ and 4″ in closely coupled relationship. The primary windings 8″ and 9″ are so connected in series that their respective magnetic fluxes are of the same polarity. These winding are used for the flow of vertical deflection current.

The secondary windings 10″ and 11″ are so connected in bucking relation that their respective magnetic fluxes may cancel one another. These windings are used for the flow of horizontal deflection current.

Elements 12″ and 13″ are plate-form magnets which are secured to the opposite end surfaces of the drum core 1″ for providing a magnetic bias flux along the longitudinal direction of the drum core 1″.

The reactor thus formed is tightly encased in a non-magnetic material casing together with an insulating member which may be of a material such as synthetic resin. There is provided in the casing at least one small hole such as, for example, several small holes 14″, 15″, 16″, 17″ and 18″ for receiving small magnet pieces for compensation and for acting on the foregoing magnetic field bias.

The position of a hole may be at any place as long as the compensating magnetic field thereof acts on the magnetic field bias. However, it is convenient for the same to be made in the upper surface of the casing so that a small magnetic piece can be readily put in and taken out. It follows that the compensation condition will be varied by the position and the number of the small magnet pieces mounted in the small holes. For example, is a small hole is provided at a position near the middle flange 6″, a small magnetic piece permanently magnetized in the front and rear directions in relation to the flange 6″ as shown in FIG. 4(A) can be mounted therein. If a small hole is provided at the middle position between the flanges 5″ and 6″, a small magnetic piece magnetized in the right and left directions as shown in FIG. 4(B) can be mounted thereon. It is morover possible that these can be used in combination with each other or in combined form.

Figure 5A:
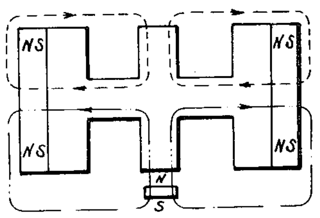
FIGS. 5 (A) and (B) are each a diagram for the explanation of a change of conditions of a magnetic field bias therein.

When the small magnetic piece of FIG. 4(A) is used at a position near the flange 6″, the magnetic field bias becomes strong at the core shaft portion between the flanges 5″ and 6″ and becomes weak at the core shaft portion between the flanges 6″ and 7″ as shown in FIG. 5(A). If the small magnetic piece is mounted therein in the reverse direction, the bias condition is changed to the opposite condition.

Figure 5B:
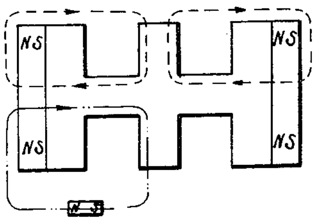

FIG. 5(B) shows the condition where the small magnetic piece of FIG. 4(B) is at the middle portion of the flanges 5″ and 6″. It is seen that the magnetic field bias becomes weak at that portion.

If the small piece is mounted therein in its reverse direction at the same position, the magnetic field is changed in reverse. Thus, the magnetic field bias in the core shaft portion is made more or less asymmetrical. Thereby, the difference between the top and bottom asymmetrical pincushion distortions can be compensated.

It should be noted that the small magnetic pieces are not limited to the form of wedges as illustrated, but may be of any form such as right quadrilateral form, cubic form of the like. However, the wedge form whereby the top and bottom and the right and left of the small magnetic piece can be easily distinguished is most convenient.

For compensation of distortion, only the necessary number of small pieces need be mounted and any number of the small available openings can be suitably chosen for use. Thus, asymmetrical top and bottom distortion can be simply compensated where the degree of pincushion distortion generated in mass-produced television receiver sets is small.

According to this invention, a fine adjustment can be simply effected. Since the magnetic field provided by the small magnetic pieces is small, the conventional defect is removed whereby the amount of compensation of the pincushion distortion itself is forced to change along with the adjustment of the difference of the pincushion distortion degree.

What is claimed is:

1. Apparatus for compensating pincushion distortion in television receivers, said apparatus comprising a core of ferrite material which is magnetic and includes a shaft and spaced flanges on the shaft defining spaces therebetween, primary and second windings on said shaft in said spaces to form a saturable reactor type transformer to generate a magnetic field bias, a non-magnetic casing encasing said transformer, said casing being provided with at least one opening, and at least one magnet in said opening in said field to influence the latter.

2. Apparatus as claimed in claim 1 wherein the magnet is wedge shaped.

3. Apparatus as claimed in claim 1 wherein the casing is provided with a plurality of openings and there are a plurality of said magnets provided in the openings, the magnets being differently magnetized.

4. Apparatus as claimed in claim 3 wherein the openings are adjacent the flanges.

5. Apparatus as claimed in claim 1 wherein the secondary windings are arranged in bucking relation.

6. Apparatus as claimed in claim 1 wherein the casing is right quadrilateral with a relatively large opening therein to accommodate said core, the first said opening being generally parallel to said large opening.

7. Apparatus as claimed in claim 1 wherein said magnet is permanently magnetized.

* * * * *